June 21, 1927.  
F. A. TURNER  
1,632,809  
RESILIENT WHEEL  
Filed April 1, 1925
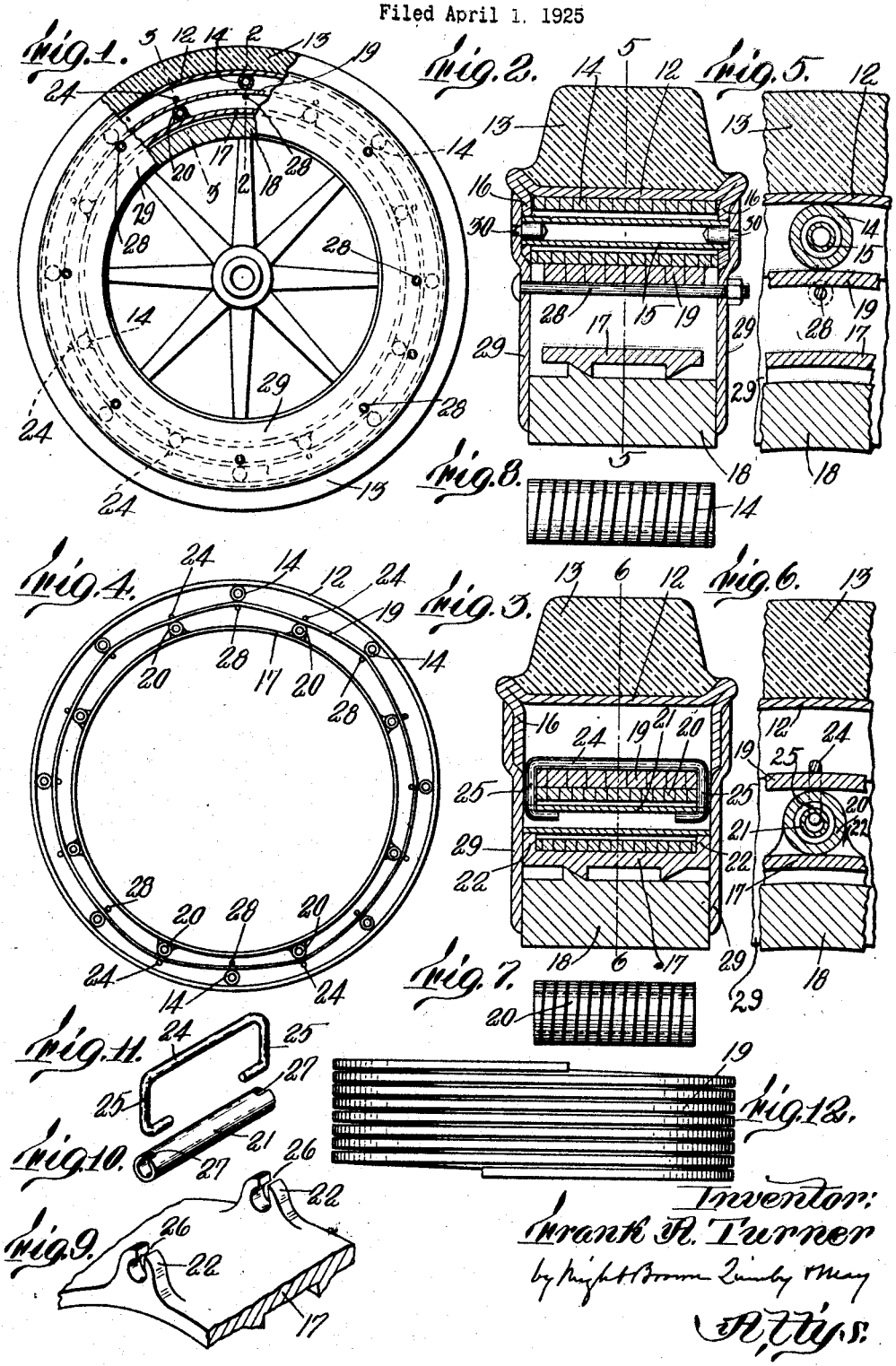

Patented June 21, 1927.

1,632,809

UNITED STATES PATENT OFFICE.

FRANK A. TURNER, OF NEW YORK, N. Y.

RESILIENT WHEEL.

Application filed April 1, 1925. Serial No. 19,862.

This invention relates to a resilient wheel characterized as disclosed by Letters Patent of the United States granted April 3, 1917, and numbered 1,221,393.

Said wheel includes a floating annular tire carrying rim having a series of spaced apart outer bearings, an annular wheel rim or felly having a series of spaced inner bearings alternating with the outer bearings, and an inextensible floating annular spring interposed between the tire and the felly in sliding contact with said bearings, said spring normally maintaining the felly substantially concentric with the tire rim and the bearings of the felly substantially central relative to those of the tire rim, and being loosely flexible by the action of the load carried by the felly, to form resilient torque-transmitting connections which yieldingly support the felly and its load under all conditions of torque-transmission.

According to the disclosure of said patent, the spring has a loose separable bearing on the said outer and inner bearings, and is not otherwise engaged or connected with the tire rim and felly.

The wheel embodying the present invention is characterized in part by spring-suspending members fixedly connected with the rim member of the tire and bearing on the inner side of the spring, and felly-suspending members, alternating with the spring-suspending members, fixedly connected with the felly, and bearing on the outer side of the spring, to suspend the felly within the spring, the object being to utilize maximum areas or segments of the spring in yieldingly supporting the felly and its load, the spring being suspended at a plurality of points from the rim member of the tire, and the felly being suspended at a plurality of points from the spring, the points of suspension of the spring and felly alternating with each other throughout extended areas or segments of the spring.

The wheel is also characterized by other improvements hereinafter appearing.

Of the accompanying drawings forming a part of this specification,—

Figure 1 is a side elevation, showing a complete wheel, parts being shown in section.

Figure 2 is a section on line 2—2 of Figure 1.

Figure 3 is a section on line 3—3 of Figure 1.

Figure 4 is a side view, showing the rim member of the tire, a portion of the felly, the hollow cylindrical abutments, the spring, and the suspending members, other parts of the wheel shown by Figures 1, 2 and 3 being omitted.

Figure 5 is a section on line 5—5 of Figure 2.

Figure 6 is a section on line 6—6 of Figure 3.

Figures 7 and 8 are side views, showing two of the hollow cylindrical abutments, made of helically coiled wire.

Figure 9 shows in perspective a portion of the felly.

Figure 10 shows in perspective one of the abutment-confining tubular rivets.

Figure 11 shows in perspective the suspending member shown by Figure 3.

Figure 12 is a side view, showing the spring made of helically coiled wire.

The same reference characters indicate the same parts in all of the figures.

In the drawings, 12 designates an inflexible annular rim or tire member which may have a resilient tread surface formed by an ordinary solid rubber tire 13.

The rim 12 is provided with inwardly projecting flanges 16, in which are formed uniformly spaced holes receiving the end portions of transverse abutment-confining members which are preferably tubular rivets 15. The end portions of the rivets 15 are inserted in the flange holes when the parts of the wheel are being assembled, and are rigidly secured therein in any suitable manner, as by expanding their ends in the flange holes, so that they prevent the flanges 16 from spreading apart.

Mounted on the rivets 15, between the flanges 16, are hollow cylindrical outer abutments 14, which loosely surround the rivets, as best shown by Figure 5, so that the rivets do not serve as bearings for the abutments, and serve only to confine the abutments in approximately the positions shown, in laterally shiftable contact with the inner surface of the rim 12, and with the outer surface of the annular spring 19, hereinafter described. It is intended that the load will be carried in part by the outer abutments 14, contacting, as stated, with the inner surface of the rim 12, and the outer surface of the spring 19.

The wheel felly includes an annular inner body portion 18, secured to the spokes, and an annular outer portion 17, which may be detachably secured to the body portion 18 by any suitable fastenings, or may be bolted or riveted to the body portion. I hereinafter call the portion 17 a felly member. The felly member 17 is provided at each edge with a series of uniformly spaced outwardly projecting ears 22 (Figure 9) having orifices which receive the ends of tubular rivets 21. The end portions of the rivets 21 are inserted in the ears when the parts of the wheel are being assembled, and are rigidly secured to the ears by any suitable means, as by expanding the ends of the rivets in the ears.

Mounted loosely on the rivets 21, between the ears 22, are hollow cylindrical inner abutments 20. Said inner abutments, which may be similar in construction to the outer abutments 14, loosely surround the rivets 21, and are confined thereby in approximately the positions shown, in laterally shiftable contact with the inner surface of the annular spring 19, and with the outer surface of the felly member 17, as best shown by Figure 6. The rivets 21, rigidly secured to the ears 22, prevent said ears from spreading apart while under load. It is intended that the load will be carried in part by the inner abutments 20, contacting as stated, with the inner surface of the spring 19 and with the outer surface of the felly member 17.

The annular spring 19 may be a continuous band or ring of resilient material, such as tempered steel. I prefer, however, to make it by winding an elongated strip of resilient wire to form a helix, as shown by Figure 12, the wire being preferably rectangular in cross section, as shown by Figures 2 and 3. The object of this construction of the spring is stated hereinafter.

The present invention is characterized in part by the outer and inner abutments 14 and 20, mounted loosely on the rivets 15 and 21, and capable of moving laterally on said rivets, for a purpose hereinafter stated. The invention is also characterized by spring-suspending members, fixedly connected with the rim 12, adjacent to the outer abutments 14, and bearing on the inner surface of the spring 19, to suspend the spring from and within the rim, and felly-suspending members fixedly connected with the felly member 17, adjacent to the inner abutments, and bearing on the outer surface of the spring, to suspend the felly from and within the spring.

These suspending members may be variously constructed and secured. The felly-suspending members are preferably transverse metal rods 24 (Figure 3), having hooked ends 25, sprung into the tubular rivets 21, through slots 26 in the ears 22 and slots 27 in the rivets (Figures 9 and 10), the rods 24 bearing on the outer surface of the spring 19. Each of the suspending members 24 is confined rigidly by the entrance of its hooked ends in the said slots, the arrangement of which is best shown by Figures 9 and 10.

The spring-suspending members are preferably transverse rods or bolts 28 (Figure 2), arranged to bear on the inner surface of the spring 19, and rigidly connected with the rim 12, by annular side plates 29, having uniformly spaced holes in which the bolts 28 are inserted. In this instance, the side plates 29 bear on the outer sides of the rim flanges 16, and are engaged therewith by pins 30, fitting loosely in the ends of the tubular rivets 15, and riveted into holes formed for their reception in the plates 29. The bolts 28 serve also to confine the side plates 29 and the pins 30 in proper relation to tubular rivets 15 and rim flanges 16.

The side plates are in sliding contact with opposite edges of the body portion 18 of the felly, as shown by Figures 2 and 3. The members 28 are located in close proximity to the outer abutments 14, as shown by Figures 2 and 5.

It will now be seen that the spring-suspending and felly-suspending members bear on the spring at a plurality of spaced apart points, so that the weight of the felly and its load is distributed over elongated areas or segments of the spring, the spring being held in suspension from the rim 12 by the suspending members 28 which bear on the inner side of the spring, while the felly is held in suspension from the spring by the suspending members 24 which bear on the outer side of the spring.

The rectangular wire forming the helical spring 19 is so wound that its convolutions are normally spaced apart, and the outer portions are therefore adapted to bear yieldingly on confining members such as the hooked portions 25 of the rods 24 and the ears 22, and prevent edgewise play of the spring and rattling contact thereof with said confining members.

The abutments 14 and 20 are also preferably composed of rectangular wire helically coiled, as shown by Figures 7 and 8. The convolutions of the wire are normally spaced apart, so that the outer convolutions in each abutment are adapted to bear yieldingly on confining members between which the abutment is interposed, without endwise play, and therefore without rattling contact with said confining members. The confining members of the outer abutment 14 are the flanges 16 on the rim 12. The confining members of the inner abutment 20 are the ears 22, on the felly member 17. In this instance, the inner abutments 20 are shorter than the outer abutments 14.

When the above-described parts are assembled without load, they will naturally assume the relative positions shown by Figure 1. When the load is applied to the felly member 17, the parts will naturally assume approximately the relative positions shown by Figure 4, some of the parts being in suspension, others in tension, and others in compression. When the felly member 17 is rotated either forward or backward, a torque-conveying condition is set up, causing rotation of the rim 12, with the felly.

I claim:

1. A resilient wheel comprising an annular tire-carrying rim having a series of spaced outer abutments projecting inward from its inner surface, an annular felly member having a series of spaced apart fixed rivets, hollow cylindrical inner abutments laterally movable on said rivets, projecting outward from the outer surface of the felly member and alternating with the outer abutments, an annular spring interposed between the rim and the felly member and contacting with the said abutments, spring-suspending members fixedly connected with the rim adjacent to the outer abutments, and bearing on the inner surface of the spring to suspend the spring from and within the rim; and felly-suspending members fixedly connected with the felly adjacent to the inner abutments, and bearing on the outer surface of the spring to suspend the felly from and within the spring, the arrangement being such that the spring-suspending and the felly-suspending members bear on the spring at a plurality of spaced apart points, so that the weight of the felly and its load is distributed over elongated segments of the spring, said spring being flexed at each of said points by movements of the felly relative to the rim.

2. A resilient wheel as specified by claim 1, said felly member being provided with slotted ears and slotted tubular rivets fixed to said ears, the said inner abutments being embodied in hollow cylindrical abutments laterally movable on said rivets between the ears, the said felly-suspending members being embodied in rods bearing on the outer side of the spring and having hooked ends sprung into the slots of said ears and rivets.

3. A resilient wheel as specified by claim 1, the rim being provided with fixed inwardly projecting annular side plates, the spring-suspended members being embodied in tranverse bolts fixed to the side plates at points adjacent to the outer abutments and bearing on the inner side of the spring.

4. A resilient wheel comprising an annular tire-carrying rim having transverse rivets spaced inward from its inner side, outer hollow cylindrical abutments movable laterally on said rivets, an annular felly member having transverse rivets spaced outward from its outer side, inner hollow cylindrical abutments movable laterally on the last-named rivets, an annular spring interposed between the rim and the felly member and contacting with said abutments, the inner abutments contacting also with the felly member, and the outer abutments with the rim, spring-suspending members fixedly connected with the rim, adjacent to the outer abutments and bearing on the inner surface of the spring to suspend the spring from and within the rim, and felly-suspending members fixedly connected with the felly member adjacent to the inner abutments, and bearing on the outer side of the spring to suspend the felly from and within the spring.

5. A resilient wheel comprising an annular tire-carrying rim having a series of spaced apart outer abutments projecting inward from its inner side, an annular felly member having a series of spaced apart inner abutments projecting outward from its outer side, an annular spring of helically coiled wire, interposed between the rim and the felly member and contacting with said abutments, and confining members carried by the rim and felly member, and contacting with opposite edges of the spring, the convolutions of the spring being normally spaced apart, so that the spring is laterally compressed between said confining members and has a non-rattling contact therewith.

6. A resilient wheel comprising an annular tire-carrying rim having a series of spaced apart outer abutments projecting inward from its inner side, and composed of helically coiled resilient wire rollers, and confining members carried by the rim at opposite ends of said abutments, having non-rattling contact with the end convolutions of said outer rollers; an annular felly-member having a series of spaced apart inner abutments projecting outward from its outer side and composed of helically coiled resilient wire rollers; confining members carried by the felly member at opposite ends of said inner rollers, and having a non-rattling contact with the end convolutions thereof; and an annular spring interpossed between the rim and felly member and contacting with said rollers.

7. A resilient wheel comprising a felly member and a rim member spaced from each other, and an annular spring between them, said two members having rolling abutments bearing alternately on the inner and outer surfaces of said spring, means being provided adjacent each abutment to bear on the surface of the spring opposite the abutment when the action of load tends to pull such abutment away from the spring.

8. A resilient wheel comprising a felly member and a rim member spaced from each other, and an annular spring between them, said two members having rolling abutments bearing alternately on the inner and outer surfaces of said spring, said abutments consisting of coiled spring wire.

9. A resilient wheel comprising a felly member and a rim member spaced from each other, and an annular spring between them, said two members having rolling abutments bearing alternately on the inner and outer surfaces of said spring, the annular spring and the abutments consisting of coiled spring wire.

In testimony whereof I have affixed my signature.

FRANK A. TURNER.